No. 709,880. Patented Sept. 30, 1902.
V. P. DE KNIGHT.
AUTOMATIC RAPID FIRE GUN.
(Application filed Sept. 5, 1900.)
(No Model.) 7 Sheets—Sheet 6.
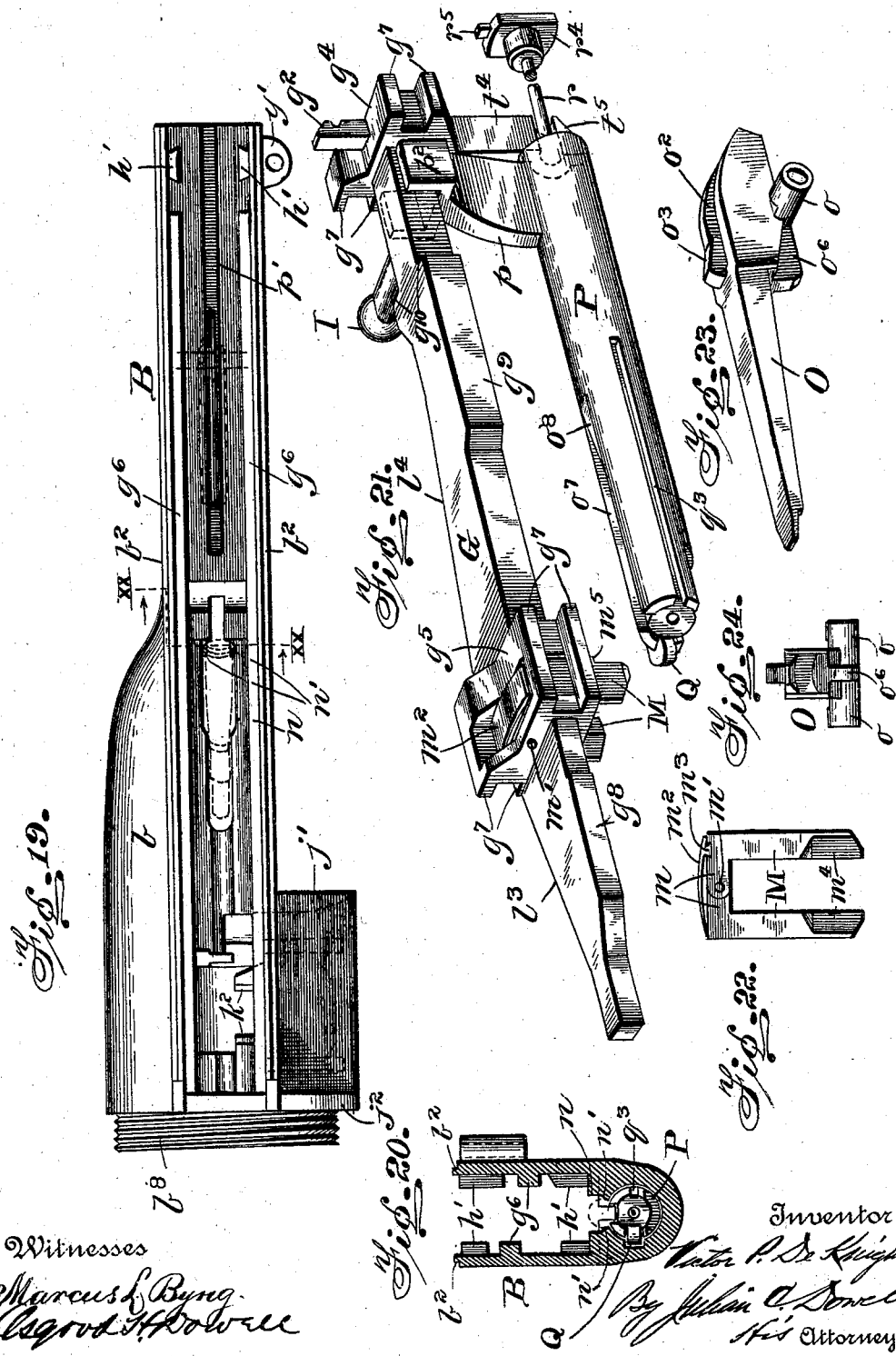
Witnesses
Marcus L. Byng
Osgood H. Dowell
Inventor
Victor P. De Knight
By Julian A. Dowell
His Attorney

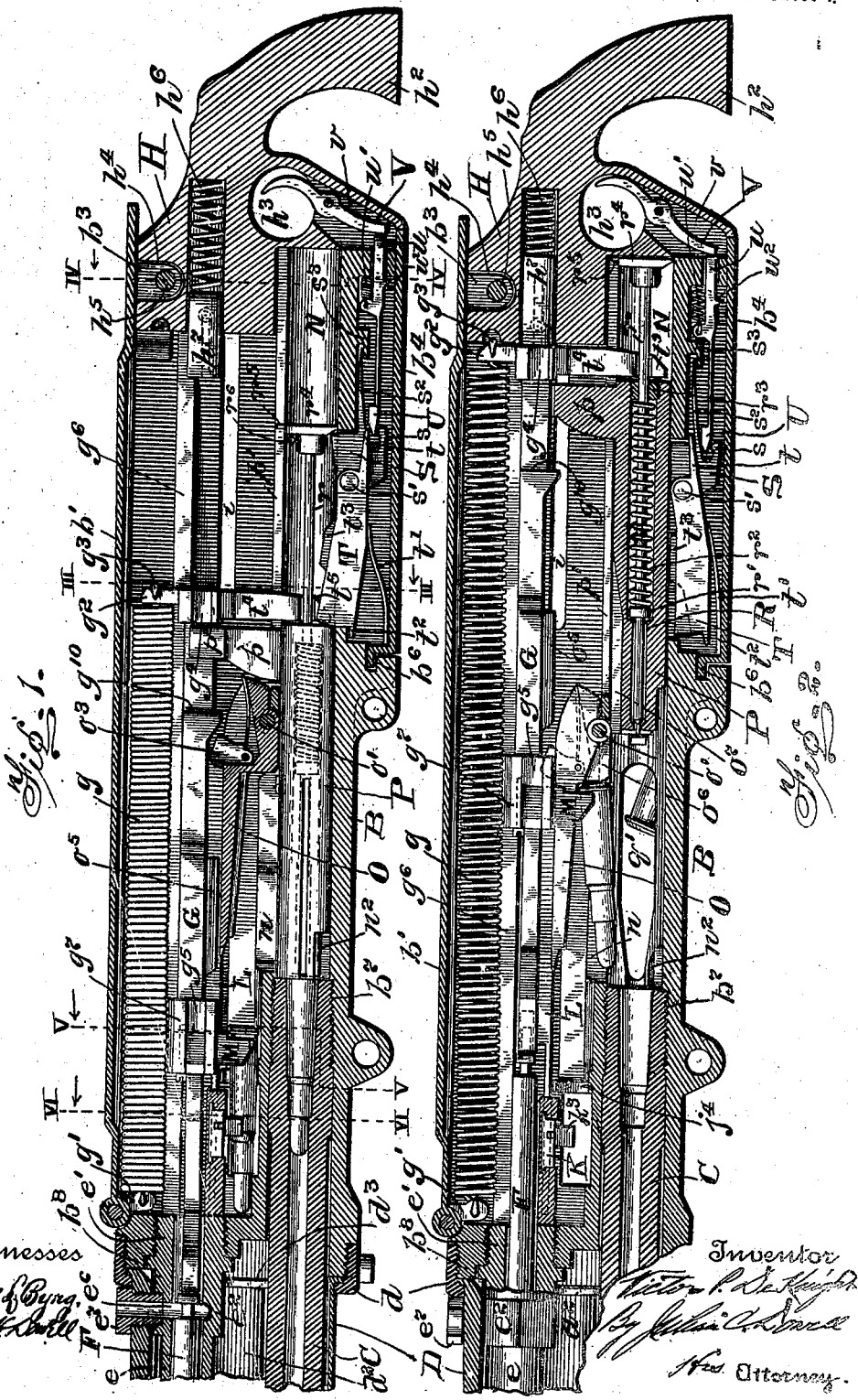

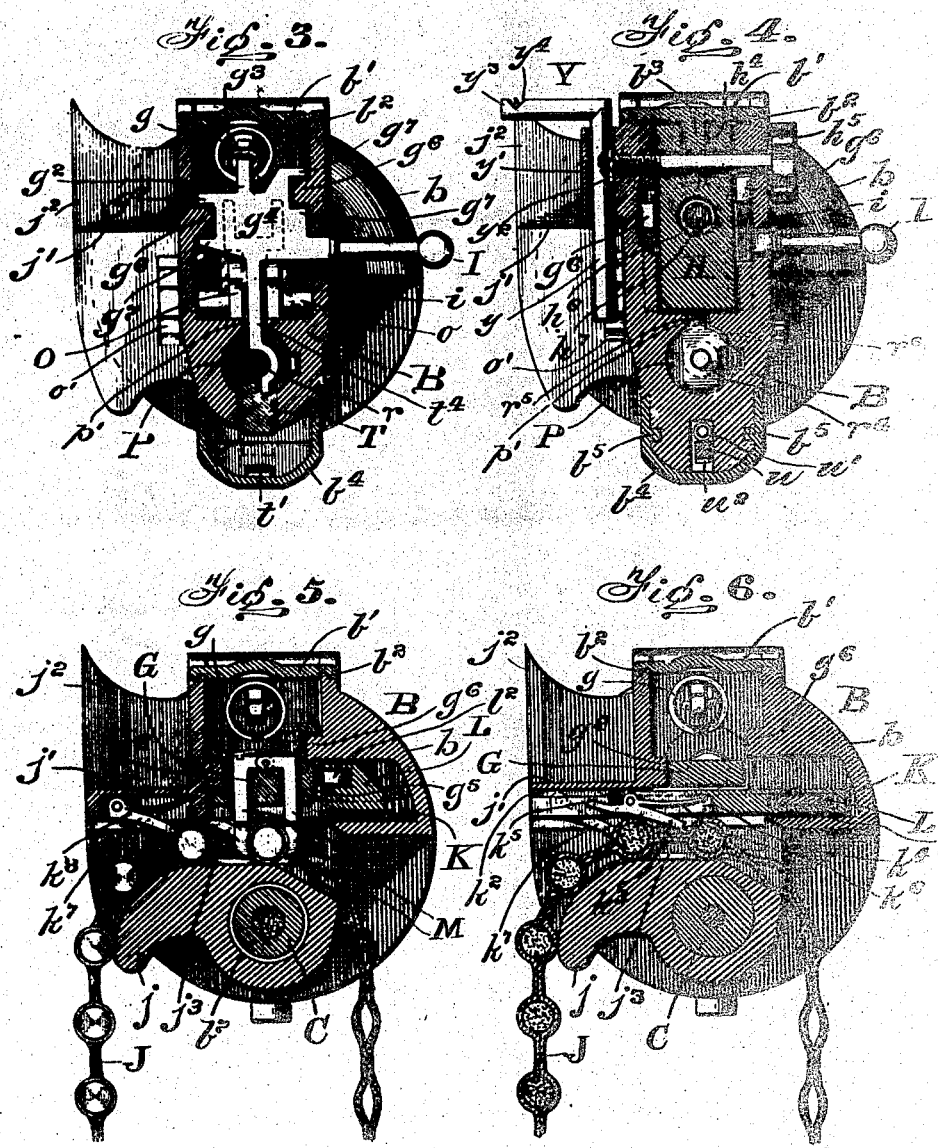

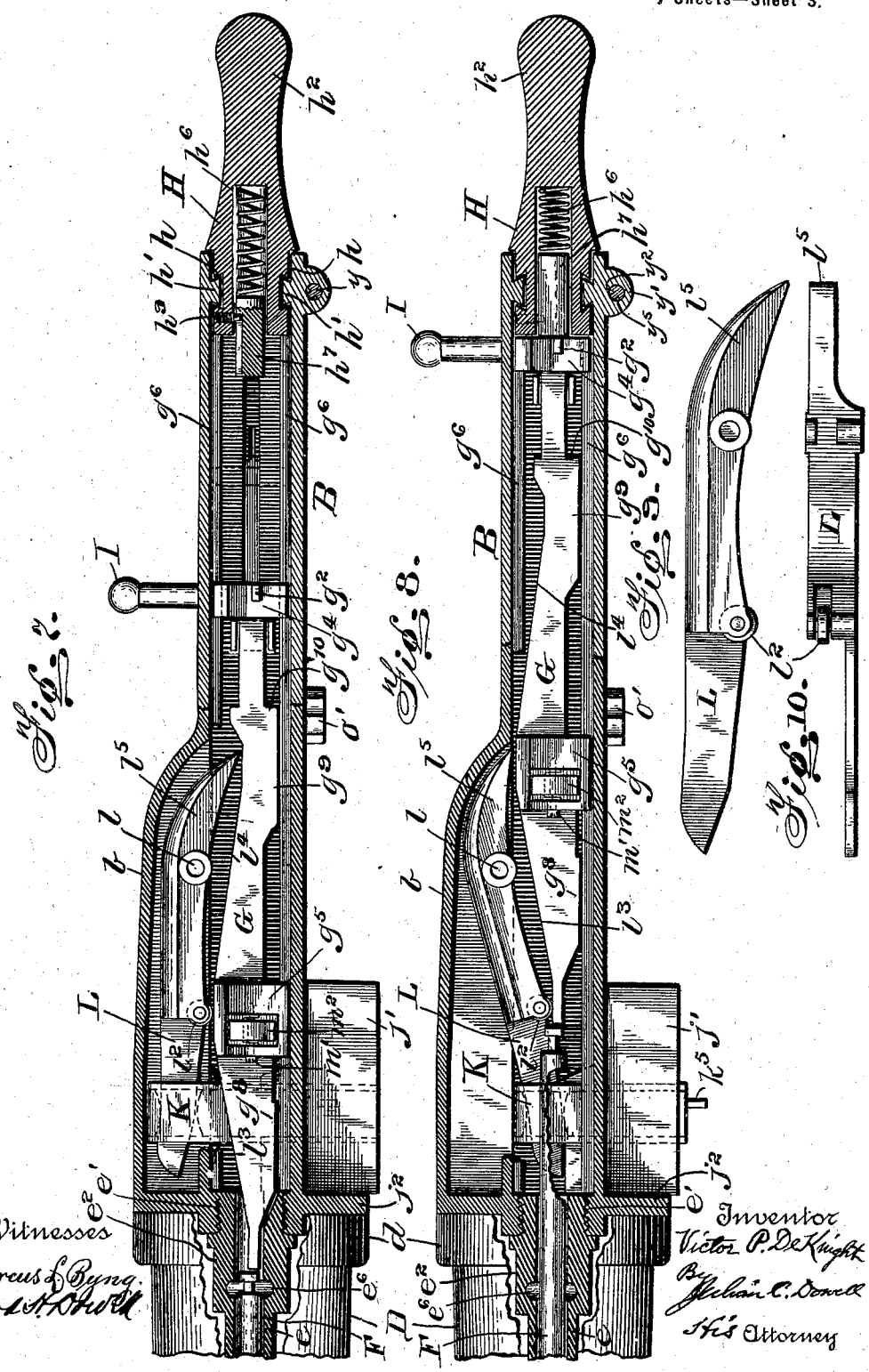

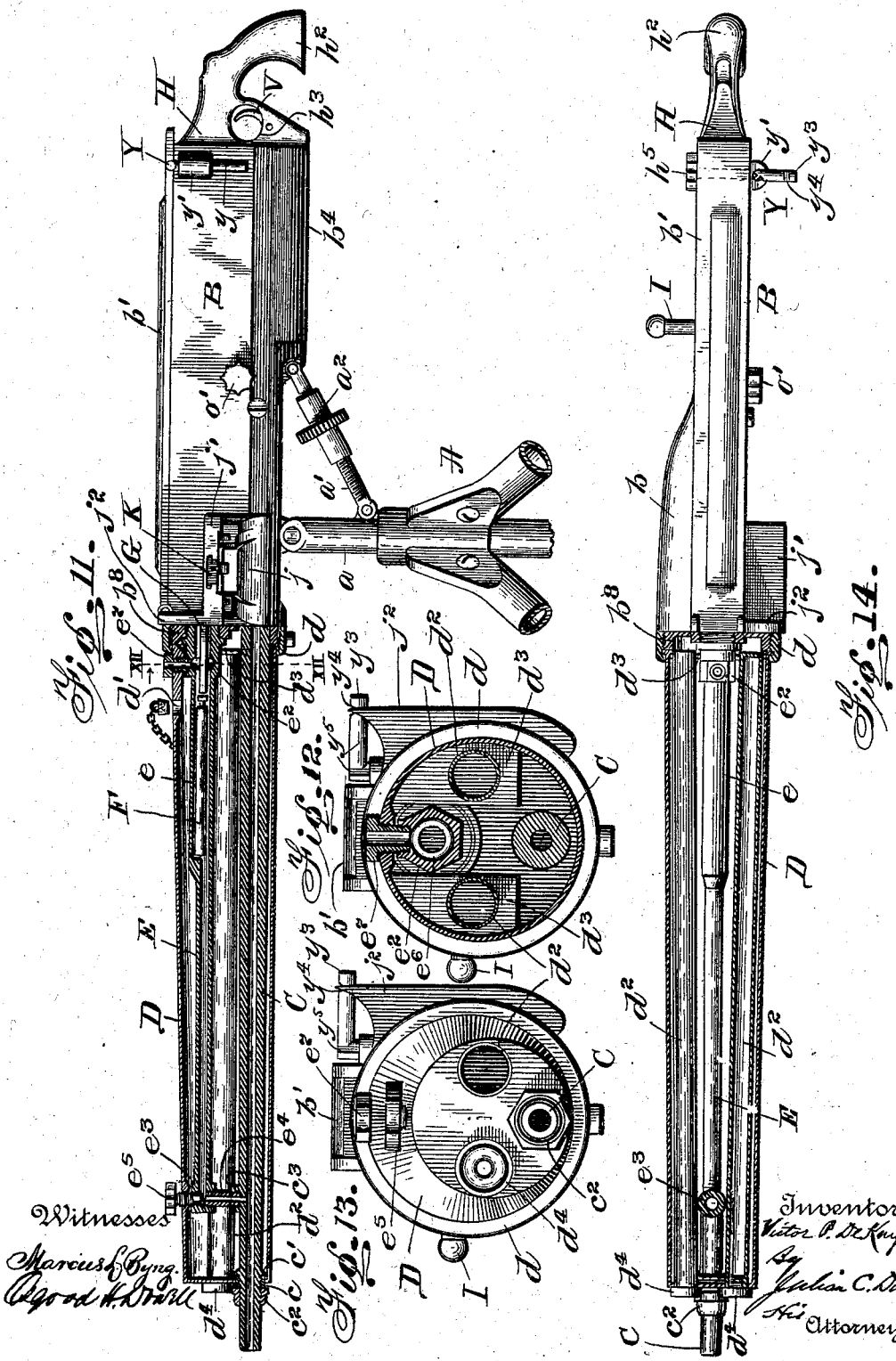

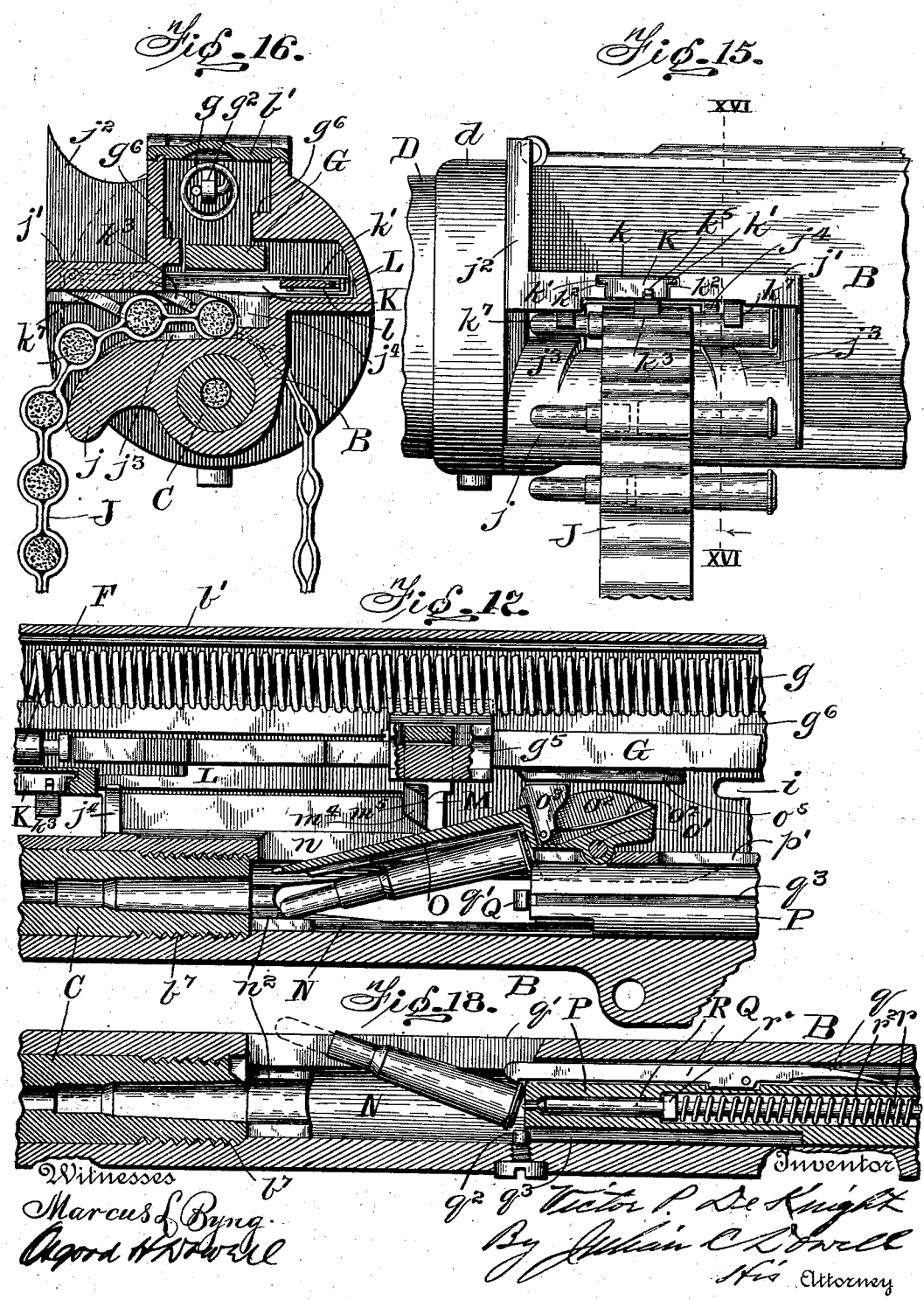

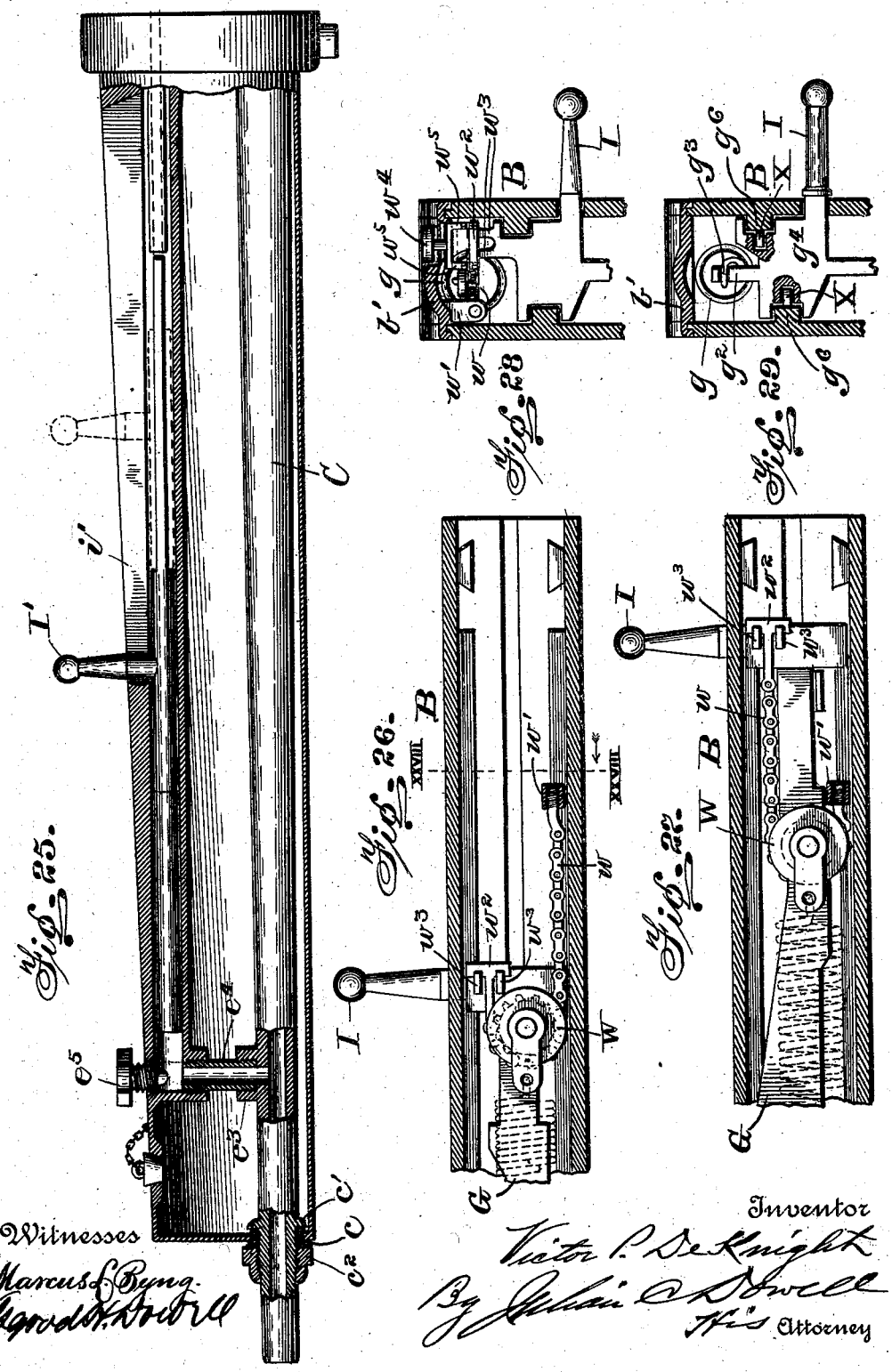

UNITED STATES PATENT OFFICE.

VICTOR P. DE KNIGHT, OF WASHINGTON, DISTRICT OF COLUMBIA, ASSIGNOR, BY DIRECT AND MESNE ASSIGNMENTS, TO THE VICTOR P. DE KNIGHT GUN COMPANY, OF WASHINGTON, DISTRICT OF COLUMBIA, A CORPORATION OF DELAWARE.

AUTOMATIC RAPID-FIRE GUN.

SPECIFICATION forming part of Letters Patent No. 709,880, dated September 30, 1902.

Application filed September 5, 1900. Serial No. 29,072. (No model.)

*To all whom it may concern:*

Be it known that I, VICTOR P. DE KNIGHT, a citizen of the United States, residing at Washington, in the District of Columbia, have invented certain new and useful Improvements in Automatic Rapid-Fire Guns; and I do hereby declare the following to be a full, clear, and exact description of the invention, such as will enable others skilled in the art to which it appertains to make and use the same.

This invention relates to breech-loading ordnance or machine-guns, and more particularly to rapid-fire guns of the type shown and described in United States Letters Patent No. 698,107, issued to me on April 22, 1902, in which the gas evolved in each discharge is utilized as a motive force to continue the several operations of loading, firing, and ejecting the empty cartridge-cases, so as to cause successive discharges to take place automatically.

My present invention is an improvement upon the machine-gun shown and described in my aforesaid patent, the principal objects being to simplify the construction, reduce the number of parts, and thus decrease the cost of manufacture and renewal of broken or worn parts, and to increase the efficiency and durability of the apparatus.

A further object is to provide for quickly assembling and attaching the several parts of the apparatus without the use of tools.

Simplicity in construction, compactness, a minimum number of parts, stability, lightness in weight of the moving parts, accessibility of all the parts, and provision for accuracy and certainty in the operation of the gun are desiderata which have been kept constantly in view in the evolution of the present invention, as in the former.

The invention will hereinafter be first more particularly described, with reference to the accompanying drawings, which form a part of this specification, and then pointed out in the claims at the end of the description.

In said drawings, Figure 1 represents in vertical longitudinal section the breech portion of a gun embodying my invention and the barrel and water-jacket being broken away, the parts being shown in the relation they maintain when the gun is not in action, but ready to fire. Fig. 2 is a similar view showing the several parts in the positions they assume immediately after a discharge and when automatic reloading is in progress. Figs. 3, 4, 5, and 6, Sheet 2, are cross-sections taken on the lines III III, IV IV, V V, and VI VI, respectively, of Fig. 1 looking in the direction of the arrows adjacent to said lines. Fig. 7, Sheet 3, represents the breech portion of the gun in horizontal section, illustrating the cartridge-feeding mechanism as it would appear when the coöperating parts are in the positions shown in Fig. 1. Fig. 8 is a similar view showing the same parts in the positions they assume when the coöperating parts are in the relative positions shown in Fig. 2. Figs. 9 and 10 represent top plan and side views, respectively, of the feed-slide-actuating lever constituting a part of said cartridge-feeding mechanism. Fig. 11, Sheet 4, represents a side elevation of the gun, partly in vertical section, with parts of the supporting-tripod broken away. Fig. 12 is a cross-section taken on line XII XII of Fig. 11 looking in the direction of the arrow. Fig. 13 is a front elevation looking at the muzzle end of the gun, the cap or cover of one of the storage-tubes in the water-jacket being removed. Fig. 14 is a top plan view of the gun, partly in horizontal section. Fig. 15, Sheet 5, is a detail view of a broken-away portion of the side of the gun, showing the cartridge-carrying belt in coöperative relation to the cartridge-feed mechanism. Fig. 16 is a cross-section taken on line XVI XVI of Fig. 15 looking in the direction of the arrow. Fig. 17 is a detail vertical sectional view illustrating the devices for guiding or pointing the cartridge in loading, these devices being shown in the positions they assume when the parts connected with the gas-operated plunger or piston have advanced a short distance under the influence of the retractile spring. Fig. 18 is a horizontal sectional view of a portion of the gun, illustrating the operation of ejecting the cartridge.

Fig. 19, Sheet 6, represents a plan view of the receiver of the gun, the operative parts being removed, illustrating in dotted lines a cartridge in position to be advanced and shoved into the chamber back of the gun-barrel. Fig. 20 is a detail cross-section taken on the line XX XX of Fig. 19. Fig. 21 is a perspective view of the gas-impelled reciprocatory structure for actuating the loading, firing, and shell-ejecting mechanism. Fig. 22 is a detail front view of the device for extracting the cartridges from the belt. Fig. 23 is a perspective view of the cartridge-depressor or rocking arm which constitutes one member of the cartridge pointing and loading mechanism. Fig. 24 is a front end view of the device shown in Fig. 23. Fig. 25, Sheet 7, is a sectional side elevation of a portion of the gun, showing a modification. Fig. 26 is a detail sectional plan view of another modification. Fig. 27 is a similar view to that shown in Fig. 26, showing the parts in different position. Fig. 28 is a transverse section taken on the line XXVIII XXVIII of Fig. 26 looking in the direction of the arrow; and Fig. 29 is a detail sectional view similar to Fig. 28, showing a modification of the latter construction.

In its general features and mode of operation the gun herein shown is substantially similar to the gun illustrated and described in my aforesaid patent; but certain parts of the operating mechanism have been materially changed and simplified and the number of parts reduced, thus reducing the cost of manufacture and also decreasing the weight, while increasing the efficiency of the apparatus.

The gun is here shown adapted to be supported by a tripod, which is denoted by the letter A, the body of the gun being pivotally mounted upon the upper end of a suitable post $a$, which is rotatably fitted within the tubular head or collar of the tripod. An extensible rod $a'$ is pivoted at one end to the post $a$ and at the other end to the under side of the body of the gun, the two members of said rod being connected by a turnbuckle $a^2$ or other suitable adjusting device, so that by turning or adjusting said device the gun may be tilted or rocked on its pivot and properly sighted.

The letter B in the drawings denotes the receiver or casing which contains the breech mechanism, C the gun-barrel, D a jacket inclosing the barrel, E the gas pipe or conduit for conveying the gases of discharge from the muzzle portion of the gun-barrel to actuate the breech mechanism, F the plunger or piston, and G a reciprocatory bar or actuator within the receiver, all of which are similar to the corresponding parts described in my former patent, but improved and simplified in construction and arrangement.

The receiver B may be of any suitable construction to properly accommodate the operating mechanism contained therein and is here shown as a comparatively narrow casing or cradle having generally vertical sides which produce compactness and present a neat and attractive appearance and enlarged or expanded at one side at its forward portion, as shown at $b$, to provide a space or chamber for a portion of the cartridge-feed mechanism to be hereinafter described. The receiver may be closed at its rear end by a substantial wedge-block or safety-block H, which forms the rear end of the gun-stock and is adapted to slide down into place, said block being preferably vertically grooved or slotted at its sides, as shown at $h\ h$ in Figs. 7 and 8, for engagement with corresponding strips or ribs $h'\ h'$, formed on the sides of the receiver. The wedge-block is thus adapted to receive the force of the blow from the backward stroke of the gas-impelled structure, to be hereinafter described, without danger of breaking or separation from the receiver. The said grooves $h\ h$ and corresponding strips $h'\ h'$ are preferably of dovetail construction, so as to obviate all liability of the spreading outwardly of the sides of the receiver or loosening of the wedge-block therein. The rear of the wedge-block is also formed or provided with a handle $h^2$, similar in form to a pistol-grip, an opening $h^3$ being left through the block in front of the handle for engagement of the trigger by the finger of the operator. By this construction the handle is made stronger and more secure to the gun than when fastened separately to the under side thereof, as well as more conveniently located, while a separate trigger-guard is dispensed with and the parts otherwise reduced in number. The upper part of the receiver is closed by a suitable plate or cover $b'$, which may be pivotally attached or hinged at one end to the front portion of the receiver and is preferably grooved around its edge on the under side thereof to fit over corresponding ribs or flanges $b^2$, formed around the top of the receiver, as shown in Figs. 3 to 6, inclusive, this construction forming a union to strengthen the walls of the receiver, so that said walls will be braced against forces brought to bear against them either from within or without the receiver. At its opposite end said top plate $b'$ is provided with a depending lug or projection $b^3$, adapted to occupy a recess $h^4$ in the upper portion of the wedge-block H, and by means of a thumb-screw $h^5$ or other suitable device, which passes through suitable openings therefor in the receiver sides and in the wedge-block and lug $b^3$, the said wedge-block and top plate may be securely fastened to the receiver. By withdrawing the thumb-screw $h^5$ said top plate may be raised, swinging on its forward pivot, and the wedge-block H slid upwardly and detached from the receiver. A space is also provided at the rear under side of the receiver, closed by a removable trough-like plate or cover $b^4$ in front of the wedge-block, said plate being provided with interior lugs $b^5\ b^5$ at its rear end, Fig. 4, and an exterior lug $b^6$ at its front end, Figs. 1 and 2, which slide into corresponding recesses or slots in the bottom portion of the receiver when the plate is secured in place. When the wedge-block is removed or raised, the bottom plate $b^4$ may be slid backwardly a short distance to disengage the lugs from the recesses in the receiver, and said plate will then drop out. A part of the firing and trigger mechanism is confined in the space beneath the receiver housed by said trough-like bottom plate $b^4$, and the spring which presses upward the breech-block lock, hereinafter to be described, may bear downwardly against said plate $b^4$, so that when the plate is disengaged from the receiver this spring may serve to force it out, thus rendering it more easily detachable. It will thus be apparent that ready access may be had to the interior of the receiver for the purpose of inspecting or detaching the operating mechanism contained therein, and the several parts of the receiver may be easily and quickly detached or assembled after drawing the single thumb-screw or pin $h^5$. The receiver is made solid at its forward end and lower front portion, which latter is longitudinally bored and screw-threaded, as shown at $b^7$, to receive the gun-barrel C, which is screwed home in said bore of this receiver. The jacket D, inclosing the gun-barrel, is secured to the forward end of the receiver, which is formed or provided with a hollow exteriorly-threaded boss or flange $b^8$, abutting the inner flanged end of said jacket, a clamping-collar $d$ taking over the flange of said jacket and engaging the screw-threads of the boss, so as to hold the jacket tightly against the same. The said jacket may be of generally cylindrical form, tapering slightly toward its forward end, through which the gun-barrel protrudes, and is preferably provided at its rear end with a portion of increased thickness, in which thicker portion is provided an orifice $d'$, which may be closed by a removable stopper, for the admission of water to the jacket to keep down the temperature of the gun-barrel and other parts contained within said jacket. The orifice $d'$ may also be used as an outlet, the gun here shown being of small caliber, and hence light enough to invert and drain the water-jacket; but where a gun of greater caliber and heavier build is constructed an outlet-orifice may be provided at any suitable point in the bottom of the jacket. To securely fasten the outer end of the barrel to the jacket and to provide an effective closure of the latter around the barrel, said barrel where it passes through the forward end of the jacket may be slightly thickened and screw-threaded, and a screw-threaded collar $c$ may be applied to said threaded portion, fitting against a shoulder $c'$ on the barrel, said collar tightly fitting an opening made for it in the end of the jacket and secured in place by a jam-nut $c^2$. The space within the jacket on each side of the gun-barrel may be utilized for placing storage tubes or chambers $d^2 \, d^2$, (see Figs. 11 to 14, inclusive,) and to support the same the jacket is preferably provided at its rear end with internal lugs or flanges $d^3 \, d^3$, apertured to receive the rear closed ends of said storage-tanks $d^2$, while the outer or forward ends of the latter are supported in openings in the front end of the water-jacket and closed by screw-caps $d^4 \, d^4$ or by other suitable means. Said tubes are preferably of sufficient size or diameter to receive a spiral spring, such as is employed for advancing the reciprocatory bar G, so that one or more of such springs may be kept always on hand within the tubes for replacing the one in use should the latter become broken or weakened, while said tubes may of course be used for storing other articles also, such as oilers, cleaning-rods, bolts, waste, and the like. To protect the springs or other articles stored within the tubes from the action of the heat generated in the water within the jacket, the tubes may be wrapped in a coating of asbestos, if desired, or other suitable jacketing material.

The gas-pipe E or conduit through which the gases of discharge are conveyed from the muzzle end of the gun-barrel to the operating or breech mechanism occupies the upper portion of the water-jacket and is here shown as a straight tube having its rear portion $e$ of greater interior diameter, so as to constitute a cylinder for the plunger or piston F, the smaller bore of the gas-pipe decreasing the volume of air and gas remaining in said pipe to be displaced by the gas from the bore of the barrel, and hence quickening the action. The rear open end of the cylindrical portion of the pipe E is exteriorly screw-threaded, as shown at $e'$, for engagement with an interiorly-threaded boss formed upon the front of the receiver in close proximity to the boss or flange $b^8$, before mentioned, the gas-pipe being screwed home in the solid front end of the receiver. Slightly in advance of said screw-threaded portion $e'$ the cylinder is preferably provided with an exteriorly-enlarged hexagonal or polygonal portion $e^2$ for engagement by a wrench or other suitable turning device for attaching or detaching the pipe. The plunger F preferably fits loosely within the cylinder $e$, so as to prevent being jammed or impeded by the accummulation of powder or soot on the cylinder-walls, and hence retarding the action of the gun, and the rear end of said plunger abuts the forward end of the reciprocatory bar G, positioned in the upper portion of the receiver, and the said forward end of which is adapted to slide through the rear of said cylinder $e$. (See Figs. 1 and 11.) Constructing the plunger or piston F and the reciprocatory bar or actuator G in separate independently-movable parts cheapens the cost of production and also avoids the injurious effect of bending or warping, which is incident to the use of an actuator and piston in a single structure. To provide for communication of the bore of the gun-barrel with the said gas-pipe, the former is preferably formed or provided upon its upper side at an appropriate point within the jacket with a boss $c^3$, having a threaded bore communicating with the bore of the barrel, and the gas-pipe is provided at its forward end with a circular head $e^3$, having an interiorly-threaded transverse opening in its bottom in alinement with the bore of the said boss $c^3$, a longitudinally-bored plug $e^4$, threaded at its ends, connecting the openings in said boss and the circular head. Said circular head has also a threaded opening in its top alining with the opening in its bottom and with a corresponding aperture in the top of the jacket D, and by means of a set-screw or choker $e^5$, entered through the said opening in the jacket and into the circular head of the gas-pipe, the amount of gas passing into the pipe from the gun-barrel may be easily regulated. To provide for the escape of the spent gases and smoke and burned powder from the gas-conduit, the bore of the cylinder $e$ is preferably enlarged or provided with an annular recess $e^6$ within the enlarged polygonal portion $e^2$, before mentioned, and said annular recess communicates with the outside of the jacket through the bore of a screw-plug or hollow bolt $e^7$, entered through an aperture in the jacket and into a recess in the polygonal portion $e^2$ of the cylinder $e$. When the plunger F is acted upon by the gases of discharge, it slides through the rear open end of the cylinder $e$, thus closing it, and the spent gases, together with the smoke and burned powder, escape through said hollow plug $e^7$ and are thus carried off from the gun instead of entering the receiver, where they would blacken and otherwise injure the operating mechanism contained therein. The annular form of said recess $e^6$ facilitates the expulsion of the burned powder and spent gases, which might otherwise be allowed to accumulate to an injurious extent, while the hollow plug is adapted to be readily removed for the purpose of cleaning out any such accumulated matter, if necessary. The location of the several ports or openings in the annular recess $e^6$ and in the circular head $e^3$ at the opposite end of the gas-pipe are such that when the pipe is screwed home in the forward end of the receiver alinement of said openings with their corresponding openings in the jacket, gun-barrel, and several plugs will follow. Besides the functions noted the screws $e^5$ and $e^7$ also aid in preventing rotation or relative displacement of the water-jacket and inclosed gas-conduit and gun-barrel connected thereto.

The bar G or slide above mentioned constitutes a member or part of the structure which is reciprocated after each discharge of the gun to effect the reloading and firing thereof, this structure (seen more clearly in Fig. 21) being driven back by the pressure of the gases of discharge against the forward end of the plunger F and being advanced by the retractile force of a single spiral spring $g$, (though in some cases more than one spring might be used,) the forward end of which spring is preferably secured to a lug or ear $g'$, depending from the top plate $b'$ of the receiver, and its rear end detachably connected to a lug $g^2$ at the rear end of the bar G, the spring being shown provided with a hook $g^3$, which fits over said lug and into a notch at the back thereof. By this arrangement when the top plate $b'$ of the receiver is opened the rear end of the spring $g$ may be easily detached and the spring thrown back and out of the way with the top plate, so as to permit unobstructed access to the operating mechanism. Said actuating-bar G is guided and controlled in its reciprocatory movements by front and rear guides or cross-heads $g^4$ and $g^5$, the forward one of which is located at an intermediate portion of the bar, said guides bearing against suitable guiding-strips $g^6 g^6$, extending along the interior walls of the receiver, and being also provided at their sides with suitable bifurcations or projections $g^7 g^7$, which embrace said guiding-strips, all turning of the bar and parts attached thereto being thereby absolutely prevented. By forming the guides or cross-heads $g^4$ and $g^5$ integrally with the bar G a very strong and efficient structure is secured, and any additional parts for backing up separate guides are unnecessary. It will be observed also that by means of the forward guide $g^5$ the bar G is braced and supported at its intermediate portion and at a point where lateral strain thereagainst is greatest, and each of said guides serves effectually to brace said bar and prevent warping and bending thereof by the several strains exerted against the bar after each discharge of the gun, thus obviating the necessity of providing additional parts—such as slides, rollers, and the like—for bracing said slide or bar G. The bar may, however, be still further braced against lateral stresses brought to bear against it by the feed-slide-actuating lever, to be hereinafter described, and without the employment of additional parts by forming portions, as $g^8$ and $g^9$, in alinement with the portions of the guides $g^4$ and $g^5$ which bear against the guiding-strips $g^6 g^6$, said alining parts, of course, also bearing against said strips to strengthen the bar. The rearward one of said portions $g^9$ serves also to back up or strengthen a shoulder $g^{10}$, which is formed on the bar at a suitable distance in front of the rear guide $g^4$ and which in the rearward movement of the bar G is designed to strike against an upstanding arm on the breech-block, it being understood, of course, that the bar is cut away intermediate said parts $g^8$ and $g^9$ for the purpose of reducing its weight. The blow of the backward stroke of the bar G is received by the safety-block H, as before mentioned, and to receive the blows said block is preferably provided with suitable cushioning means, which may consist of a stiff spring $h^6$, incased within a suitable recess or chamber in the block and behind a buffer $h^7$, forward movement of said buffer being limited by means of a screw or pin $h^8$, entered through the side of the wedge-block and into a slot in said buffer, as shown in Fig. 7, or other suitable cushioning means may be employed. A rearward stroke of the bar G is necessary for the loading of the gun, and in the present invention the manipulative means employed for effecting such stroke at the outset is exceedingly simple, consisting of a hand-pull or handle, which may project either from the bar G through a slot in the receiver or from the plunger F through a slot in the water-jacket. The former arrangement is clearly illustrated in Figs. 3, 7, and 8, where the letter I denotes the hand-pull or handle projecting from the bar G through a slot $i$ in the side of the receiver. With this construction a forward stroke of the bar G, as well as a rearward stroke, may obviously be effected by means of the handle I, and hence in cases of emergency, as where the spring $g$ breaks in action, said handle may be moved rapidly backward and forward and rapid firing of the gun manually accomplished, the choker or thumb-screw $e^5$ being, of course, first screwed down to close the plug $e^4$ to cut off the gases of discharge and prevent them from acting against the plunger F. The latter arrangement is illustrated in Fig. 25, where the letter I' denotes the hand-pull or handle projecting from the plunger F through a slot $i'$ in the top of the water-jacket D. In this construction the gas-conduit is formed integrally with the water-jacket, the water-orifice being situated at the forward end of the jacket. The spent gases of discharge, with the smoke and burned powder, will obviously escape through the slot $i'$, thus dispensing with the annular recess and bored plug or hollow bolt for this purpose in the former arrangement. This construction is sometimes preferable on account of its simplicity and reduction of the number of parts.

The cartridge feeding and pointing mechanism is similar to that described in the specification of my former patent, though the number of parts is reduced and the construction and arrangement simplified, while the efficiency of the apparatus is increased. The cartridges are fed to the gun in a belt J, which is formed or provided at suitable intervals with a series of pockets to receive the same, said pockets embracing the central portions of the cartridges, so that the latter project to a considerable extent on each side of the belt. Said belt passes transversely through the front portion of the receiver, traveling over the solid lower front portion thereof, in which the barrel C is fitted, the cartridges being fed or supplied one after the other into the space or chamber formed above such solid portion between the receiver-walls. The belt enters an opening in one of said walls of sufficient width to permit the cartridges to pass freely through it, and the empty portion of the belt has an exit through a narrow opening on the opposite wall or side of the receiver after the cartridges have been extracted therefrom. (See Figs. 5 and 6.) At the side where the cartridge-belt enters the receiver, said solid lower front portion thereof is preferably provided with a lateral projection $j$, suitably curved or rounded to permit the belt of cartridges to slide smoothly over it into the receiver, said projection taking the place of the supporting-roller for the belt employed in my former device, thus reducing the number of parts and rendering the gun more compact. Above said projection $j$ the receiver is formed with a horizontally-disposed ledge or lateral extension $j'$, which may terminate at its front end in an upright portion $j^2$ to form a sight and at its rear end in a downwardly-turned portion uniting with the projection $j$. The passage-way between the openings through the receiver-walls is suitably channeled to accommodate the belt J, while the cartridges ride upon ledges $j^3 j^3$, left along each side of the channel, of sufficient height to cause the belt to be raised slightly above the channel, so as to prevent frictional contact of the belt with the bottom of the passage and adapt it to be easily pushed inward by the feed-slide K. The forward one of said ledges is preferably higher than the other, so that the cartridge resting with its flanged head on the rearward ledge and its ball on the other will be held horizontal, as shown in Fig. 15. Said ledges preferably merge outwardly into the curved surface of the projection $j$ of the receiver, while their inner ends terminate in stops or shoulders $j^4 j^4$ within the receiver, against which one of the cartridges is lodged after each discharge of the gun. To prevent the cartridges from rising after striking against said stops $j^4$, the upper portions of one or both of the latter are preferably curved outwardly, so as to overlie the cartridge and cause the same to enter beneath them, the ledges $j^3$ and outwardly-curved stops $j^4$ thus forming a throat to receive the cartridge, as illustrated in Fig. 16. It will be observed also that the ledges $j^4$ converge slightly toward their inner ends, where the stops $j^4$ are formed. By this arrangement the rear stop is left considerably forward the flanged head of the cartridge, so as not to interfere with the action of the extractor-fingers, hereinafter described.

The feed-slide K, which carries the cartridge-belt a distance into the receiver after each discharge of the gun, is here shown as a single bar or slide-piece arranged to reciprocate in a horizontal plane above the belt, being slidably supported in a recess or slot $k$ in the under side of the horizontal ledge or projection $j^2$. (See Figs. 15 and 16.) The slide may be provided at its sides with ribs or flanges $k' k'$, which engage corresponding grooves $k^2 k^2$ of the slot $k$ or may be otherwise suitably supported therein. The slide is provided with a feed-dog $k^3$, pivoted in a recess or slot $k^4$ and having a rearwardly-projecting finger-piece $k^5$, which bears upwardly against the slide, so as to properly limit downward movement of the dog, which latter is adapted to drop down far enough to effectively engage the cartridge-belt back of one of the pockets containing a cartridge, as seen in Fig. 6, to shove the belt forward into the receiver. By means of the finger-piece $k^5$ when two cartridges have been fed at the same time into the throat, because of improper manipulation of the pull or handle I in starting the gun, the dog can be raised to permit the dog to ride over the second cartridge, which may then drop back to its proper place. The feed-dog may be actively pressed downwardly for engagement with the cartridge-belt during the inward movement of the slide by means of a flat spring $k^6$, which is preferably formed integrally with the feed-dog, so as to reduce the number of separate parts, its free end bearing against the upper wall of the slot or recess $k^4$. When the slide moves outwardly, the said spring $k^6$ yields to permit the feed-dog $k^3$ to slip easily past the cartridge next to be advanced by it. To prevent backward movement of the cartridge-belt during the outward travel of the slide, pawls or catches $k^7$ may be pivoted in suitable recesses or slots $k^8$ in the ledge or projection $j'$ and arranged to stand behind the cartridge next to the one being extracted. Said catches may be pressed downward by springs pressing from the tops of the recesses, which springs are preferably formed integrally with the catches to reduce the number of parts, while downward movement of the catches is limited by reason of their abutment against the outer walls of their slots $k^8$. It will be observed that the feed-dog engages the belt on forward movement of the slide about midway the cartridge, thus obviating the necessity of using more than one feed-dog, and the feed-dog is also positioned out of the way of the extractor-fingers, so as not to interfere with their movement in extracting the cartridge from the belt. It will also be observed that the feed-dog is here shown positioned to act against the cartridge which is to be extracted instead of the one next to the same, as in my former gun. This construction, besides permitting a shorter feed-slide to be used and conducing to compactness, is more effective for feeding the belt and also dispenses with an abutment-piece at the tail end of the belt for the dog to engage when feeding the last cartridge into the throat. The feed-slide is caused to travel back and forth to feed the cartridges into the throat by the reciprocatory movement of the bar G, the motion being transmitted through the medium of a lever L, suitably connected to the feed-slide and pivotally supported, as at $l$, within the receiver, said lever being adapted to vibrate in a horizontal plane. As here shown, the forward end of the lever L is reduced in thickness and entered through a slot $l'$ in the feed-slide, the sides of said slot being suitably curved or rounded to permit the necessary play of the lever therein, as represented in dotted lines in Figs. 7 and 8, and the forward end of the lever may also be slightly curved, as shown, to insure a smooth sliding contact between the same and the sides of said slot. By this construction a much stronger and more durable connection is made between the lever and the feed-slide than with a pin-and-slot connection or with other similar arrangements, while the number of parts is reduced. This lever L carries an antifriction-roller $l^2$, adapted to bear against an incline or cam-surface $l^3$ on the side of bar G, which incline runs down gradually from the guide $g^5$ toward the forward end of the bar, practically merging into the surface of said bar. A second incline $l^4$ at the reverse angle to the one first mentioned runs down gradually from the guide $g^5$ toward the rear end of the bar, also practically merging into the surface of said bar. Upon the rearward movement of the bar G said incline $l^4$ encounters a tailpiece $l^5$ of the lever L, whereby the lever is positively impelled in a direction to move the feed-slide outward. On the reverse or forward movement of the bar G the antifriction-roller $l^2$ rolls up the incline or cam-surface $l^3$, thus drawing the feed-slide inwardly, so as to push a cartridge into the throat formerly mentioned, where it is taken from the belt by the extractor-fingers M. The bar G is braced against lateral strains caused by the action of the lever L thereagainst by means of the guide $g^5$ and the portions $g^8$ and $g^9$ alining therewith, which bear against the guiding-strip $g^6$ at the opposite side of the receiver, as before stated. The extractor-fingers M are carried by the bar G at a point coincident with the forward guide or cross-head $g^5$, it being observed that said guide is positioned at the rearward end of the incline $l^3$, so that on the forward stroke of the bar a cartridge is lodged in the throat just before being reached by said fingers. As here shown, the extractor-fingers are provided with inwardly-extending portions or lugs $m$, which occupy a slot or recess in the top of the cross-head $g^5$, being pivotally connected together and to said cross-head by means of the single pivot-pin $m'$, while the fingers proper depend through vertical openings provided therefor in the bar G. The fingers are normally pressed toward each other by means of a flat spring $m^2$, inward movement of the fingers being limited by their abutment against the sides of the bar G, and said spring is preferably provided with a dovetail projection $m^3$ at one end, which slides into a transverse correspondingly-shaped slot at the top of one of said fingers, while the free end of the spring bears against the other finger. The lowermost confronting portions of the fingers may be cut away or inclined obliquely, as shown at $m^4$, (see Fig. 22,) so that their rearmost edges are nearer together than their forward edges. In the forward movement of the bar G said inner oblique faces of the fingers contact with the head of the cartridge, the spring $m^2$ yielding to permit the rearmost edges to pass the flange, so that upon rearward movement of the bar the fingers will operate to extract the cartridge from the cartridge-belt, suitable spurs or shoulders $m^5$ being formed on the rear edges of the fingers to prevent the cartridge from rising above proper position when being extracted. After being extracted and carried rearwardly the cartridge is deposited in advance of the breech-block in a suitable chamber or slideway N, formed in the bottom of the receiver and in alinement with the gun-barrel, but of greater bore than said barrel. To receive the cartridge, said chamber is provided in its upper portion, just back of the gun-barrel, with an opening $n$ of sufficient size to permit the passage of the cartridge except at the rear end of said opening, where lugs or protuberances $n'$ effect a contraction thereof to prevent the flange of the cartridge from passing through when in its rearmost position, as shown in Fig. 19, where the dotted lines represent the cartridge resting with its flanged head on said lugs. When moved slightly forward, said flanged head clears the projection $n'$, thus letting the cartridge into the chamber.

The letter O denotes the rocking arm or depressor, by means of which the cartridge is lowered from the extractor-fingers on the rearward movement of the bar G and directed into the chamber or slideway N, said arm being pivoted a short distance back of the rear end of the opening $n$. As here shown, the arm is provided with a tubular portion or journal $o$ on its under side through which the pivot-pin $o'$ is inserted, said pin being in the form of a thumb bolt or screw, so as to be readily detachable, and entering suitable apertures in the receiver and bridging the slideway N. The arm preferably stands normally in substantially a horizontal position, thus permitting a close arrangement of parts and consequent reduction of the size of the receiver. The lower side of the arm is preferably dished or grooved to conform to the curvature of the cartridge and is slightly inclined or tapered upwardly toward the forward end, which is higher than the spurs $m^4$ on the fingers M, so that the extractor-fingers in moving rearward carry the cartridge underneath the arm, the said fingers passing on either side of the latter and the cartridge being caused to move downwardly between the fingers, though not to be entirely released therefrom, as shown in Fig. 2. To depress the arm for the purpose of directing the cartridge into the chamber or slideway N, its rear end is preferably slotted or recessed, as shown at $o^2$, and a cam-piece or wiper $o^3$ is pivoted within said slot and normally pressed against the forward end thereof by a flat spring $o^4$ or other suitable means, said cam-piece standing in the path of a projection or spline $o^5$ on the under side of the bar G. When the bar G moves rearward, the projection $o^5$ displaces the cam-piece $o^3$, which falls back into the slot $o^2$ by reason of the yielding of the spring $o^4$, so that the arm O remains in its horizontal position; but upon the forward movement the said projection encounters the cam-piece, riding against the upper surface thereof, with the effect of depressing the arm (see Fig. 17) and holding it in said depressed position, with its front end in line with the bore of the gun-barrel, said arm thus constituting a guide for pointing the cartridge and insuring its proper delivery into the barrel. It will thus be seen that a very effective device is provided for depressing the rocking arm, while the parts are few in number and simplified in construction. To raise the arm O, said arm is provided with a lug or projection $o^6$ on its under side adjacent the pivot, which lug depends through a slot in the top plate of the chamber N and occupies a groove $o^7$ in the top of the breech-block P, terminating in a cam-surface or incline $o^8$, which incline on the forward movement of said breech-block encounters the beveled or curved rear edge of said lug $o^6$, thereby raising the arm, which latter is of course maintained in its normal horizontal position when the breech-block is in its forward position, as shown in Fig. 1, by reason of the lug $o^6$ resting on the upper surface of said block. The cam-surface or incline $o^8$ has such slant that the arm O is raised gradually and not too suddenly during the forward movement of the breech-block. The rocking of the arm is positively limited by reason of the abutment of the portions of its under side adjacent to and on opposite sides of the journal $o$ against the top plate of the chamber N, said journal being formed lower than said portions and occupying a tubular bearing in said top plate, which construction is strong and effective and dispenses with extra limiting-stops.

The forward end of the rocking arm O is preferably formed, as shown in Fig. 23, with a screw-driver point, so that when the arm is detached from the gun it may be used for the purposes of such a tool, the projecting journal portion $o$ constituting a handle. This is to provide for withdrawing or inserting the pivot-pin of the feed-slide-actuating lever L for the purpose of detaching said feed-slide or lever, said pivot-pin being preferably in the form of a screw and inserted through an aperture in the receiver, though any suitable pivot may be employed. The arm O may be easily detached by withdrawing the thumb-bolt $o'$, and hence the necessity of providing separate tools for detaching or assembling the several parts of the gun is obviated, the remaining parts being adapted to be placed together or taken apart by hand.

The breech-block P above mentioned is substantially similar to that described in the specification of my aforesaid patent, having an upstanding arm $p$ at its rearward end, which projects through a longitudinal slot $p'$ in the upper side of the chamber or slideway N and which is formed at its upper end with bifurcations $p^2\,p^2$, which loosely embrace the bar G between the rear guide or cross-head and shoulders $g^{10}$ thereof, so that the bar G travels a certain distance in its rearward movement before the breech-lock is moved. The U-shaped construction of the head of the arm $p$ admits of its being quickly detached from the bar. The cartridge having been delivered by the arm O into the position shown in Fig. 17, it will be encountered by the breech-block in the forward movement of the latter and slid along until its flanged head clears the lugs $n'$, whereupon the cartridge will drop down in front of the breech-block, its flanged head occupying the circular recess therefor in the forward end of said block concentric with the bore of the gun-barrel, it being understood that said recess will close upon said head owing to the high speed of the breech-block. The ball end of the cartridge will be supported upon a fixed concave seat or guide $n^2$ at the forward end of the chamber N of suitable thickness or height to direct the cartridge into the bore of the gun-barrel. The cartridge is thus properly pointed and its proper delivery into the gun-barrel insured, the head being firmly held in the cylindrical recess in the front end of the breech-block and its ball directed between the seat $n^2$ and depressed arm O, and hence extra pointing mechanism positioned at the under side of the receiver may be advantageously dispensed with. The breech-block shoves the cartridge into the barrel in position for firing, the forward end of the block being cut away on its under side to ride over the concave seat $n^2$.

Simplified means is also provided in the present invention for withdrawing and ejecting the empty shell after the cartridge has been fired. A single catch Q is pivoted in a groove or slot in one side of the breech-block, its forward end being pressed normally inward to overlap the circular recess in the front end of the block by a spring $q$, which is preferably formed integrally with the heel of the catch. When the breech-block closes the breech, this catch snaps over the flange of the cartridge and upon the rearward movement of the block serves to extract the spent shell, which is ejected end over end through an opening $q'$ in the side of the receiver by reason of its encountering the inner end of a screw $q^2$, set at a proper point in the receiver or other suitable projection, the side of the breech-block adjacent said screw $q^2$ or projection being of course suitably slotted or grooved, as shown at $q^3$, to permit the passage of the breech-block past the same.

Some of the principal features of the present invention reside in the simplification and improvement of the firing and trigger mechanism, which will be noted in the following description. The breech-block is centrally bored to receive the firing-pin and hammer-stem, being bored out in larger diameter a suitable distance from the forward end. The firing-pin R, which of course occupies the forward central bore, is here formed integrally with the hammer or as a continuation of the hammer-stem $r$, which has a stop or enlargement $r'$, fitting the enlarged bore of the breech-block and normally pressed against the forward end thereof by means of a suitable spiral spring, as $r^2$, which spring may surround the stem and be confined between said stop and a screw-plug $r^3$, closing said enlarged bore of the breech-block. The hammer-stem, which slides through said plug $r^3$, has at its rear end a cross-head $r^4$, fitting the chamber or slideway N and having a finger $r^5$, slidable as a guide in the slot $p'$. When the breech-block moves forward, said cross-head $r^4$ will be engaged and held by the sear S, thus compressing the spring $r^2$, as represented in dotted lines in Fig. 1, so that by tripping the sear the hammer will be released and the firing-pin caused to act against the cartridge. By this simplified construction better results are obtained than where the firing-pin and hammer act separately, while the number of parts is reduced. The parts may also be detached from the breech-block by removing the rear plug $r^3$. The sear S, which has its heel $s$ projecting rearwardly, is suitably pivoted, as at $s'$, within the space beneath the receiver, which is housed by the removable bottom plate $b^4$ and is normally pressed upward by a flat spring $s^2$, which is preferably formed integrally with the sear or by other suitable means. As here shown, said spring bears downwardly against a hook $s^3$, depending from the under side of the receiver and preferably formed integrally therewith, and upward movement of the sear is limited by abutment of said spring against said under side of the receiver.

The letter T denotes the breech-block lock, also pivoted at $s'$ and having a rearward projection or heel $t$, which stands normally slightly above the heel $s$ of the sear, and said lock is pressed upward through the slot in the bottom of the receiver by a flat spring $t'$, which is superior in strength to the spring $s^2$, the upward movement being limited by a projection $t^2$, which encounters the under side of the receiver. The breech-block lock is formed with a cam projection $t^3$, which when the lock is in its uppermost position, Fig. 1, stands in line with an arm $t^4$, depending from the bar G or the guide $g^4$ thereon, the lower part of said arm passing through the slot $p'$ and being shaped to partially embrace the hammer-stem as a guide, and upon rearward movement of the bar G before the shoulder $g^{10}$ thereof encounters the head or bifurcations $p^2$ of the arm $p$ the lower beveled extremity $t^5$ of this arm encounters and coacts with the beveled front side of said cam projection $t^3$, so that the lock which normally stands behind the breech-block is displaced, thus permitting the breech-block to pass over it in moving rearwardly. The forward extremity of a wedge U enters between the heels $s$ and $t$ of the sear and breech-block lock, said wedge being carried by a flexible extension of a horizontally-disposed rod or slide-piece $u$, which slides through an opening therefor in the rear of the receiver and which abuts a trigger V, pivoted in a suitable slot or chamber $v$ in the wedge-block H, having its finger end projecting from said slot into the opening $h^3$ for engagement by the finger of the operator. The wedge-piece $u$ is normally retracted and the finger end of the trigger thus pressed forward by means of a spring $u'$, the rearward movement being limited by a projection $u^2$, which encounters the rear wall of the receiver. While the trigger is in its normal position (see Fig. 1) the sear remains in position to prevent the action of the firing-pin; but upon drawing back the finger end of the trigger the wedge U is forced farther between the heels $s$ and $t$ of the sear and breech-block lock, and the spring $t'$ being stronger than the spring $s^2$ the forward end of the lock T is forced upwardly, engaging the back end of the breech-block, the heel $t$ bearing downwardly upon the inserted intervening wedge U, which in turn lowers the sear from engagement with the cross-head $r^4$, and when so released the firing-pin is driven against the cartridge, and so long as the wedge is interposed to the same extent between the heel-pieces of the sear and breech-block lock the upward movement of the latter under the influence of its stronger spring will effect a displacement of the sear and release of the firing-pin each time the lock locks the breech-block, so that the firing of the gun will continue till the finger of the operator is released from the trigger. It will thus be seen that the firing and trigger mechanism is much simplified and compactly arranged, while the number of parts is reduced. The trigger mechanism is also supported directly under the receiver and protected by the removable plate $b^4$, access thereto being thus easily had, and the handle or grip is formed at the rear of the wedge-block, thus rendering the gun stronger and more compact.

The operation of the gun will be readily understood from the foregoing description, taken in connection with the accompanying drawings. A belt of cartridges having been introduced into the receiver, so that the first cartridge is in proper position to be extracted from the belt, and the extractor-fingers having been previously retracted by the handle I, (which it will be remembered is secured to the bar G,) so as to snap over the flanged head of the cartridge, the said handle is then drawn back to the limit of its rearward movement, so as to extract the cartridge from the belt, and is then released, so that this first cartridge is introduced into the bore of the gun-barrel and the second cartridge grasped by the extractor-fingers. The gun is now ready for firing, and by pulling the trigger the wedge U will displace the sear, thereby releasing the firing-pin. As soon as the ball passes the port $c^3$ the gases of discharge travel back through the gas-conduit E and operating against the plunger F drives the bar G and its attached parts back against the action of the spring $g$, and the gas having spent itself the bar is advanced by the retractile force of said spring, thereby repeating the firing of the gun automatically, which automatic firing will be continued so long as the operator's finger is held against the trigger. On the rearward movement of the bar G the extractor-fingers M pull the cartridge from the belt and carry it back under the arm O to the position shown in Fig. 2. At the same time the feed-slide K moves outward, the feed-dog snapping behind the next cartridge in the belt. The breech-block P remains locked in its forward position until the bar G has traveled a slight distance, when the shoulder $g^{10}$ encounters the bifurcated head of the arm $p$ and drives the breech-block rearward, it having been just unlocked by the action of the arm $t^4$ against the cam projection $t^3$ of the breech-block lock T, and the effect of the blow of the shoulder $g^{10}$ against the head of the arm $p$ is such as to cause the breech-block to move rearward till said arm encounters the guide or cross-head $g^5$ just as the bar G reaches the limit of its rearward movement. In said rearward movement of the breech-block the empty shell is drawn out of the breech by the catch Q and ejected through the opening $q'$ in the receiver just before the limit of the rearward movement of the reciprocatory structure is reached, Fig. 2, and while the next cartridge is still above the chamber formed between the breech and breech-block, and the cross-head $r^4$ at the rear of the hammer-stem $r$ is also carried back of the sear S, so that in moving forward said cross-head will encounter the sear, whereby the firing-pin will be restrained and the spring $r^2$ compressed. On the forward movement of the bar G the fingers M instantly leave the cartridge and the projection $o^5$ encounters the cam-piece or wiper $o^3$, whereby the arm O is depressed and the ball end of the cartridge dropped onto the seat $n^2$ directly back of the gun-barrel, and at the same time the guide or cross-head $g^4$ encountering the head of the arm $p$ the breech-block is slid forward and acts against the cartridge to shove it forward into the breech. As the cartridge is shoved into the breech the breech-block is driven home, the extractor-catch Q snapping over the flange of the cartridge, and the parts assume the normal firing position, (shown in Fig. 1,) the feed-slide having also moved in and lodged a cartridge in the throat, where it is seized by the extractor-fingers. The trigger being drawn back by the operator, upward movement of the breech-block under influence of its stronger spring causes downward movement of the sear and the release of the firing-pin, so that the cartridge which has just been introduced into the breech of the gun-barrel is immediately discharged. This operation may be repeated indefinitely and with great rapidity.

I thus provide a very efficient automatic rapid-fire gun having its working parts greatly reduced in number as compared with similar guns heretofore in use, simplified and improved in construction, and arranged in compact form, so that the weight and cost of manufacture are decreased, while the durability and efficiency of the apparatus are improved.

If in starting the gun the operator after drawing back the handle I should fail to allow the bar G to advance to the full limit of its forward movement, so that the cartridge is not engaged by the extractor-fingers and two cartridges are thus improperly fed into the throat at the same time, the feed-dog may be slightly raised by means of the finger-piece $k^5$ to permit the dog to ride over the second cartridge, which may drop back into place, as before mentioned, and should a cartridge become choked in transit from the belt to the breech access may be readily had thereto by raising the top plate $b'$, while means is also provided for access to any portion of the operating mechanism.

An important feature of the present invention resides in the adaptability of the several parts of the gun to be easily and quickly taken apart or assembled without the use of tools, the construction of each of the parts and their arrangement having been designed with this end in view, as before mentioned.

In the modification illustrated in Figs. 26 to 28, inclusive, the spiral spring $g$ is represented as provided at its rear end with a pulley W, over which is passed a rope or chain $w$, secured at one end to a lug or projection $w'$, depending from the top plate $b'$ of the receiver and having its other end formed or provided with a T-shaped piece $w^2$, which is held normally in contact with an upstanding U-shaped arm $w^3$, carried by the actuating slide-bar, and when the bar moves rearward from the position shown in Fig. 26 the piece $w^2$ is drawn rearward with the bar, thereby stretching the spiral spring $g$, as shown in Fig. 27, and the bar being then released will be advanced by the retractile force of said spring. At a suitable point in the top plate $b'$ there is a vertically-slidable spring-supported pin $w^4$, having depending arms $w^5$, which when depressed project into the path of the T-shaped piece $w^2$. Hence when the slide-bar is retracted by the spring and the pin $w^4$ depressed the T-shaped piece $w^2$ will catch onto the depending arms $w^5$ and stop the movement of the spring, while the bar G continues to advance. When thus engaged, the spring $g$, with its pulley or chain, may be lifted with the top plate and swung forward to permit unobstructed access to the interior of the receiver. By this construction the travel of the spring is lessened, and hence its life increased.

In the modification illustrated in Fig. 29 the guide-blocks of the bar G are represented as bearing against the guide-strips $g^6$ through the medium of antifriction-rollers X, fitted in suitable recesses in said blocks. Such rollers may also be provided between the guide-strips $g^6$ and the embracing bifurcations or arms $g^7$ on said guide-blocks or between other sliding surfaces, or other suitable antifriction devices might be employed.

A vertically-adjustable sight Y is preferably employed at the rear of the gun in alinement with the sight $j^2$ and may consist of a rod $y$, fitting a tubular projection $y'$ on the receiver and held at any desired height by the protruding end of the thumb-screw which secures the top plate and wedge-block to the receiver, the rod being preferably grooved, as at $y^2$, to receive the pointed end of the screw to prevent the rod from turning. Said rod $y$ has a lateral sight-arm $y^3$, having a notch $y^4$ therein for sighting and is also preferably grooved vertically, as at $y^5$, so that when the fastening-screw is loosened the rod may be turned partly around to throw its lateral arm into a position parallel with the gun-barrel, which is desirable when the gun is not in use.

It is obvious that various changes may be made in the details of construction and arrangement of parts without departing from the spirit and scope of my invention and that the location of coöperating elements on adjacent parts may in some instances be reversed. For example, the ribs or guides within the receiver, which are embraced by the bifurcated arms on the actuator, might be placed on the latter and adapted to enter longitudinal grooves or between parallel ribs on the receiver; and where friction-rollers are employed on a traveling part in contact with a stationary part, or vice versa, the arrangement may be reversed. Hence I do not desire to be restricted to the specific construction and arrangement of parts described and shown.

As a safety device when the gun is not in operation a pin or set-screw $r^6$ may be entered through the side of the receiver and into the chamber N, the same being adapted to be pushed inward to form a stop or limit to the forward movement by the cross-head $r^4$, so as to prevent said cross-head from being released and causing the firing-pin to act against the cartridge.

Having thus fully described my invention, what I claim as new, and desire to secure by Letters Patent of the United States, is—

1. In a machine-gun, the combination of the receiver or cradle for the breech mechanism, the detachable wedge-block at the rear of the receiver, a top plate or cover hinged at one end and having a pendent lug at the other end thereof engaging a recess in the wedge-block, and a single fastening device securing said receiver, wedge-block and top plate together, substantially as described.

2. In a machine-gun, the combination with the breech mechanism, of the receiver or cradle therefor having the detachable safety or wedge block and the removable top plate hinged at one end and having a projection at the other end thereof occupying a recess in said wedge-block, and a fastening-pin inserted through the receiver-walls and the said wedge-block and projection, whereby the wedge-block and top plate are secured together and to the receiver, substantially as described.

3. In a machine-gun, the receiver or cradle containing the cartridge loading and firing mechanism, and having a longitudinal slot in its bottom, in combination with the trigger mechanism located below said bottom, and a detachable bottom plate inclosing the space occupied by said trigger mechanism outside of the receiver; whereby said trigger mechanism is housed underneath the receiver-bottom and access thereto is readily afforded by removing said bottom plate, substantially as described.

4. In a machine-gun, the combination with the operating mechanism, of the receiver or cradle therefor having the detachable wedge-block adapted to be slid down into place, and the trough-like plate or cover detachably secured to the under side of the receiver for housing a portion of the operative mechanism, said plate having a supporting-lug engaging a support on the under side of the receiver and being held in place by the wedge-block, and a spring constituting a portion of said operative mechanism bearing against said plate so as to actively force out said plate when the wedge-block is lifted and the plate disengaged from its support; substantially as described.

5. In a machine-gun, the combination with the operative mechanism, of the receiver or cradle therefor having the detachable wedge-block adapted to be slid down into place, and the removable top and bottom plates or covers, said bottom plate being secured in place by the wedge-block and adapted to be slid backward and detached from the receiver only when said wedge-block is raised, and said top plate being hinged to the receiver at one end and detachably secured thereto and to said wedge-block at the other end thereof so as to confine the wedge-block and through it the bottom plate in place by a single fastening device; substantially as described.

6. In a machine-gun, the receiver or cradle containing the cartridge loading and firing mechanism, and having a wedge-block adapted to be slid down into place to close its rear end, in combination with the trigger mechanism located below said bottom, and a detachable longitudinally-slidable bottom plate inclosing the space occupied by said trigger mechanism outside of the receiver; said bottom plate and receiver having coacting engaging means for retaining said plate in a fixed position on the receiver and adapting it to be slid backward and removed only when the wedge-block is raised, substantially as described.

7. In a machine-gun, the combination with the breech portion and the barrel, of the water-jacket inclosing said barrel, and a storage tube or chamber inclosed within the water-jacket and having its open end accessible through an opening in said jacket; substantially as described.

8. In a machine-gun, the combination with the breech portion and barrel, and the water-jacket inclosing said barrel, of a storage tube or chamber inclosed within said jacket and having its open end protruding through an opening in the forward end of the latter; said jacket having an interior projection or bracket for supporting the other end of said tube or chamber; substantially as described.

9. In a gas-operated rapid-fire gun, the combination of the barrel having a screw-threaded socket on one side with a port through the bottom thereof, a gas conduit or pipe having a transversely-apertured and screw-threaded head, a longitudinally-bored plug uniting said head and socket to provide communication between said gas-conduit and the bore of the barrel, and a plug or "choker" inserted through an aperture in the jacket and entering the aperture in said head; substantially as described.

10. In a gas-operated rapid-fire gun, the combination of a barrel having a screw-threaded socket on one side with a port through the bottom thereof, a gas-conduit having screw-threaded sockets formed on opposite sides thereof with ports therethrough, a hollow plug or coupling uniting one of the latter sockets with the socket on the barrel, and a plug or "choker" in the form of a set-screw protruding through the socket on the gas-conduit opposite said hollow plug into the bore of the gas-conduit; substantially as described.

11. In a gas-operated rapid-fire gun, the combination with the barrel, the gas-conduit communicating therewith in the rear of its muzzle and extending back to the operating parts of the gun, and the water-jacket inclosing said conduit and barrel, of the valve or choker in the form of a thumb-screw entered through an aperture in said jacket and having its end protruding into the bore of the gas-conduit; substantially as described.

12. In a gas-operated rapid-fire gun, a gas-conduit communicating with the bore of the gun-barrel at the forward part of the same, and a cylinder forming a continuation of said conduit and having an interior recess near its rear end and a port communicating with said recess to provide for the escape of spent gases and refuse from the conduit, in combination with a piston in said cylinder having a recessed terminal portion or reduced extension coincident with the recess in the cylinder in the normal position of the piston, and mechanism adapted to be operated by said piston, substantially as described.

13. In a gas-operated rapid-fire gun, a gas-conduit communicating with the bore of the gun-barrel at the forward part of the same, a cylinder compounded with said conduit, a plunger or piston in said cylinder, and mechanism adapted to be operated by said plunger; said cylinder having an interior annular recess near its rear end and a hollow plug communicating with a port leading from said recess to provide for the escape of gas and air from the conduit; substantially as described.

14. In combination with the gun-barrel, the water-jacket, the gas-conduit communicating with the forward portion of the barrel and extending back to the operating parts of the gun and having an annular recess therein, and a hollow plug entered through an aperture in said jacket and communicating with said recess, so as to provide for the escape of gas and refuse from the gas-conduit to without the gun; substantially as described.

15. In a gas-operated rapid-fire gun, the combination with the barrel and a gas-conduit connected to and communicating therewith rearwardly of its muzzle and extending back for coöperation with the breech mechanism, of a water-jacket inclosing said conduit and barrel, and a pair of set-screws entered through apertures in said jacket near its opposite ends into registering apertures in said conduit and adapted to prevent rotation or relative displacement of said jacket, conduit and connected barrel, one of said set-screws being adapted to control the gas-inlet to said conduit, and the other being in the form of a hollow plug through which spent gases may escape from the conduit; substantially as described.

16. In a gas-operated rapid-fire gun, a gas-conduit communicating with the barrel and having a cylinder and a piston working therein, said cylinder having an interior annular recess provided with a port for the escape of gas and refuse from the conduit, in combination with a reciprocatory actuator for the breech mechanism independent of the piston having a forward extension adapted to enter said conduit and to be backwardly impelled by the piston; substantially as described.

17. In a gas-operated rapid-fire gun, the combination of a gas-conduit communicating with the barrel at the forward part thereof and extending rearwardly therefrom, a plunger or piston working in a cylindrical portion of said conduit, a reciprocatory actuator for the breech mechanism movable independent of the plunger and adapted to be impelled in one direction by said plunger, and a single retractile spring arranged to act directly on the actuator in opposition to the impelling action of the plunger so as to store power which is exerted in impelling the actuator in the opposite direction; substantially as described.

18. In a machine-gun, the combination with the receiver or casing having the removable top plate and the reciprocatory actuator or slide inclosed therein, of an interposed spiral spring for advancing said actuator having one end secured to the top plate and its other end detachably connected with the actuator so that said spring may be detached from the actuator and removed with said top plate to permit access to the operating parts in said receiver; substantially as described.

19. In combination with the breech mechanism of a machine-gun, and a reciprocatory actuator therefor, a rocking cartridge depressing and pointing arm, a cam piece or wiper pivotally supported on said arm and extending into the path of movement of a part carried by the actuator, together with said part having an elongated contacting surface adapted to engage said wiper and thereby depress and hold the arm down when the actuator is moving in one direction; said wiper being adapted to yield by contact with said part when the actuator is moving in the opposite direction, substantially as described.

20. In combination with the breech mechanism of a machine-gun, and a reciprocatory actuator therefor, a rocking cartridge depressing and pointing arm, a spring-pressed cam piece or wiper pivotally supported on said arm and extending into the path of movement of a contacting portion carried by the actuator, so as to contact therewith when the latter is reciprocated, together with an elongated projection forming said contacting portion adapted to engage said wiper and thereby depress and hold said arm down when the actuator is moving in one direction; said wiper being adapted to yield by contact with said projection when the actuator is moving in the opposite direction, substantially as described.

21. In combination with the reciprocatory actuator for the breech mechanism, a pair of cartridge-extracting arms pivotally connected at their upper ends, and a spring secured on one arm having a free end bearing on the other arm and adapted to yieldingly force the pendent portions of the arms toward each other; substantially as described.

22. In a rapid-fire machine-gun, the combination with the reciprocatory actuator for the breech mechanism, of the rocking cartridge depressing arm or lever having a spring-pressed cam piece or wiper pivoted thereon with which an engaging part of the actuator contacts, on the forward movement of the latter, depressing the arm and directing the cartridge into the cartridge-chamber of the barrel; said cam-piece being adapted to yield or recede out of the path of said engaging part on the backward movement of said bar, so as not to affect the position of said arm, substantially as described.

23. The combination, in a machine-gun, of a receiver having openings in opposite sides and a passage-way between said openings for the passage of the cartridge-belt, a ledge at each side of said passage-way to support opposite ends of the cartridge, which ledges converge toward their inner ends, internal stops or shoulders at the termini of said ledges to arrest the cartridge, one of said shoulders having an extension which is adapted to overlie and hold the cartridge down, means for drawing the cartridge-belt through said passage-way to feed the cartridges successively against said shoulders and beneath said overhanging extension, and means for extracting the arrested cartridge from the belt; substantially as described.

24. In a rapid-fire machine-gun, the combination with the receiver, and the longitudinally-reciprocating actuator, and the reciprocatory feed-slide arranged to slide across the path of movement of said actuator to successively advance a cartridge into a passage-way through the receiver, of the vibratory lever for actuating said slide arranged substantially parallel with the actuator and having an extension loosely fitting a transverse slot or recess in the feed-slide, and means for actuating the lever by direct contact with the actuator; substantially as described.

25. In a rapid-fire machine-gun, a reciprocatory structure adapted to be actuated in one direction by force resulting from a discharge and advanced by a spring in the opposite direction; said structure comprising an actuator for receiving the direct impact of the retracting force and having abutment pieces or shoulders, and a breech-block having a bifurcated arm which embraces said actuator between the abutment-shoulders thereof, said breech-block being thus detachable from said actuator, and a sufficient space being provided between said abutment-shoulders to permit movement of the actuator independent of the breech-block; substantially as described.

26. In a rapid-fire machine-gun, a reciprocatory structure adapted to be actuated in one direction by force resulting from a discharge and advanced by a spring in the opposite direction; said structure comprising an actuator for receiving the direct impact of the retracting force and having abutment pieces or shoulders, and a breech-block having a bifurcated arm which embraces said actuator between the abutment-shoulders thereof, said breech-block being thus detachable from said actuator, and a sufficient space being provided between said abutment-shoulders to permit movement of the actuator independent of the breech-block, said actuator being operatively connected with means for feeding a belt of cartridges into the receiver, extracting them one by one, and loading and firing the extracted cartridges; substantially as described.

27. In a rapid-fire machine-gun, the combination of a breech-block, a spring-pressed hammer carried thereby, a locking-piece spring-pressed to lock the breech-block and having a rearwardly-extending heel, a sear pivoted concentrically with said locking-piece and having a rearwardly-extending heel confronting that of the latter, said sear being pressed to hammer-engaging position by a spring inferior to that which actuates the locking-piece, a wedge entered between said confronting heels and carried by a horizontally-disposed flexible rod or piece slidable through the rear end of the gun-casing, and means for manipulating said wedge; substantially as described.

28. In combination with the breech-block and spring-pressed hammer carried thereby, the concentrically-pivoted sear and breech-block lock arranged horizontally beneath the breech-block chamber and spring-pressed upward for locking said breech-block and hammer, respectively; said sear and lock having rearward confronting projections or heels, a horizontally-disposed wedge entered between said heels, and means for manipulating said wedge; substantially as described.

29. In combination with the reciprocatory actuator for the breech mechanism having a pair of vertical apertures therethrough, a pair of cartridge-extracting arms depending through said apertures and having inwardly-extending portions or lugs at their upper ends pivotally connected, and a spring on one of said arms having a bearing on the other adapted to yieldingly force the depending portions thereof toward each other; substantially as described.

30. In a gas-operated machine-gun, the combination with the gas-conduit in communication with the barrel, and the plunger-cylinder, of the reciprocatory plunger, and the independently-movable reciprocatory actuator; one of said reciprocatory parts being provided with a hand-pull projecting through a longitudinal slot in the casing, for manual operation; substantially as described.

In testimony whereof I affix my signature in presence of two witnesses.

VICTOR P. DE KNIGHT.

Witnesses:
C. M. CLARKE,
J. C. DOWELL.